June 26, 1923.
A. T. KUEHNER
1,460,100
PIPE JOINT
Filed April 12, 1920
3 Sheets-Sheet 1
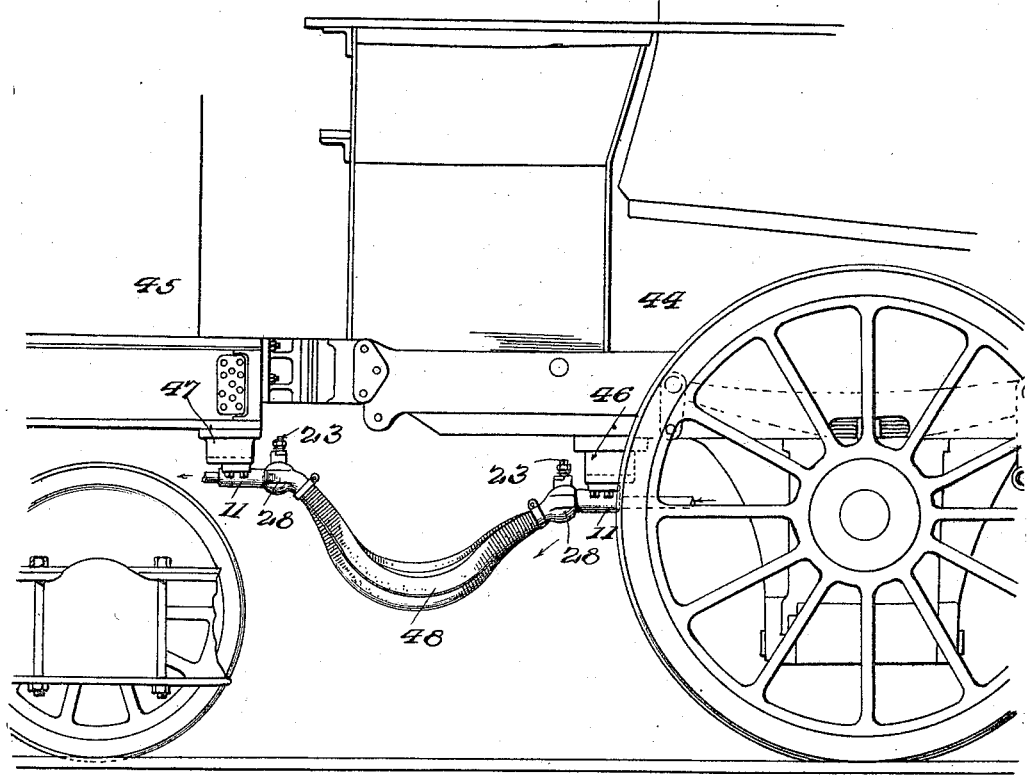
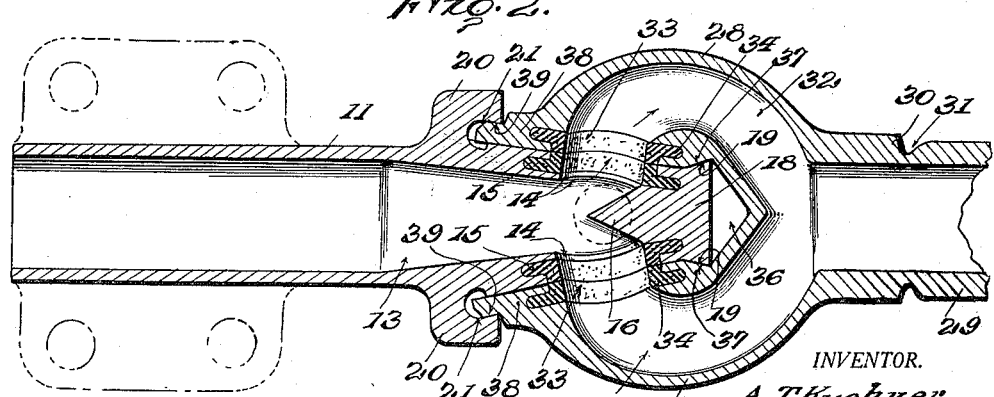
INVENTOR.
A. T. Kuehner.
BY
Lacey & Lacey,
ATTORNEYS June 26, 1923.
A. T. KUEHNER
PIPE JOINT
Filed April 12, 1920
1,460,100
3 Sheets-Sheet 2
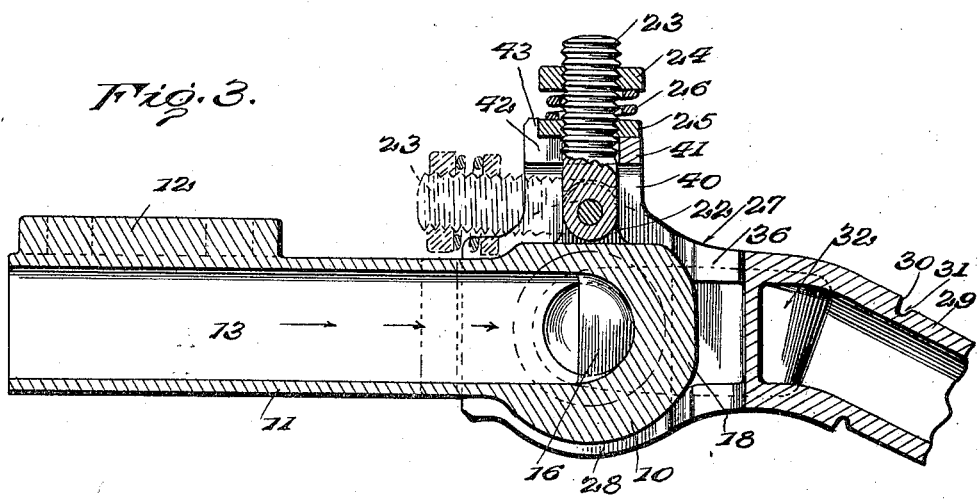
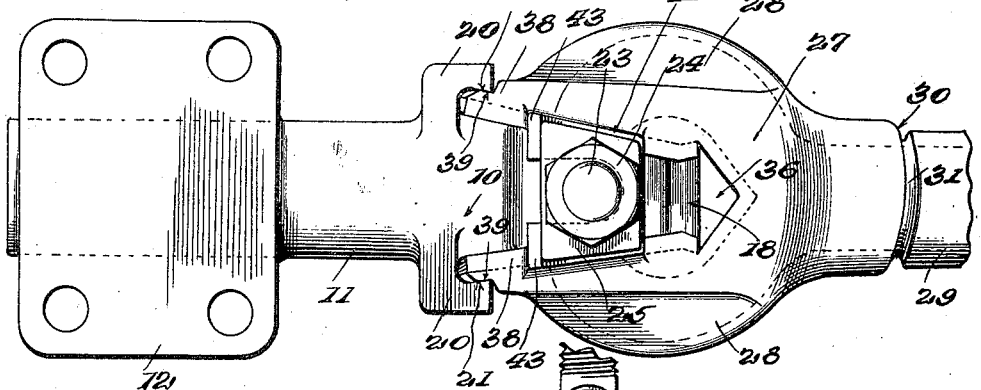
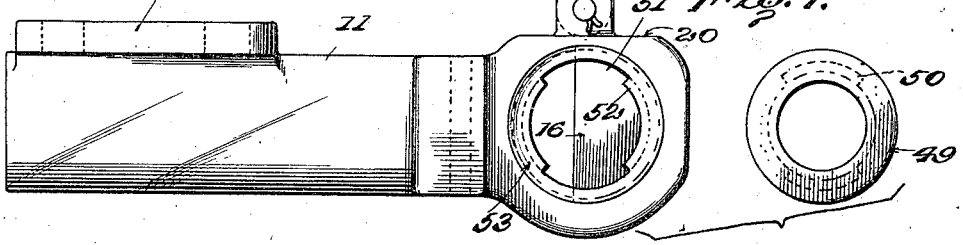
A. T. Kuehner. INVENTOR.
BY
ATTORNEYS June 26, 1923.
A. T. KUEHNER
PIPE JOINT
Filed April 12, 1920 3 Sheets-Sheet 3
1,460,100
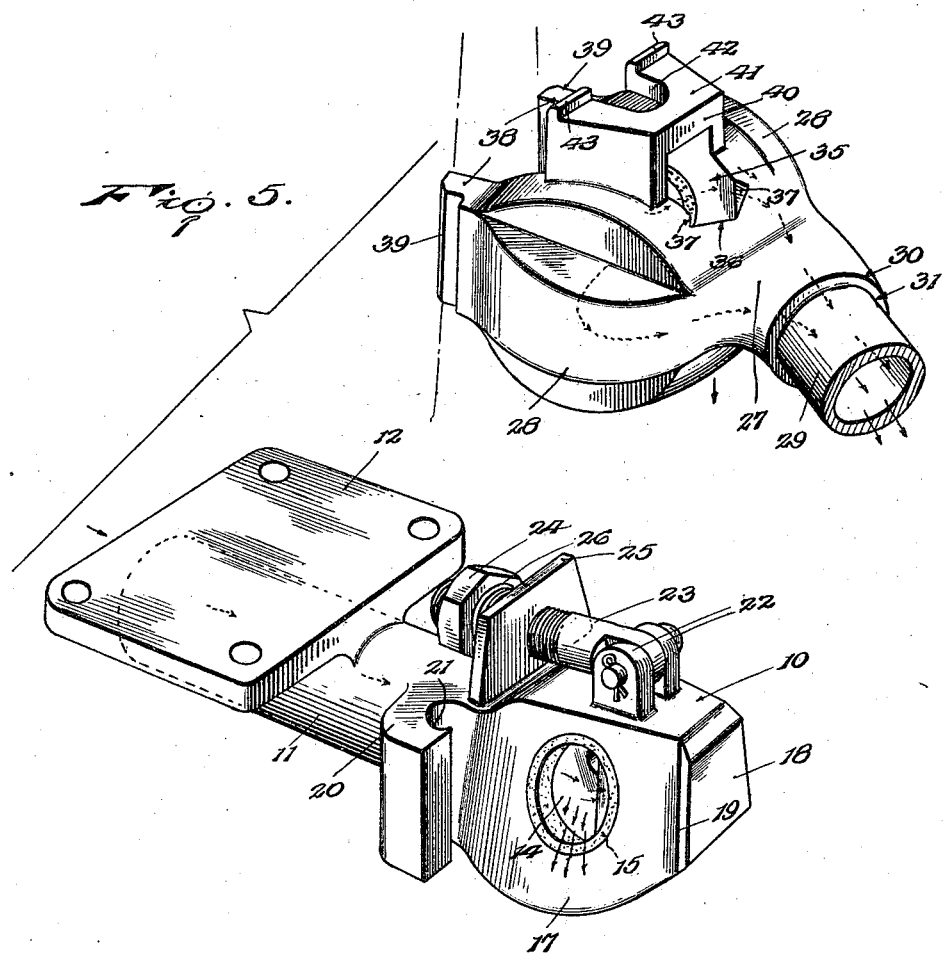
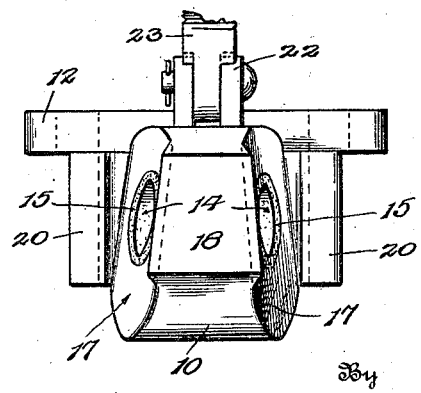
Inventor
A. T. Kuehner.
By
Lacy & Lacey, Attorneys Patented June 26, 1923.

1,460,100

UNITED STATES PATENT OFFICE.

ARTHUR T. KUEHNER, OF ELKRIDGE, MARYLAND.

PIPE JOINT.

Application filed April 12, 1920. Serial No. 373,381.

*To all whom it may concern:*

Be it known that I, ARTHUR T. KUEHNER, citizen of the United States, residing at Elkridge, in the county of Howard and State of Maryland, have invented certain new and useful Improvements in Pipe Joints, of which the following is a specification.

This invention relates to an improved pipe joint especially adapted for flexible conduits and has as one of its principal objects to provide a superior practical joint for use as a pipe connection between a locomotive and its tender, in the washout and blower lines of roundhouses, or in connection with other railroad equipment.

The invention has as a further object to provide a joint which may, without the use of a wrench or other auxiliary tool, be easily and quickly coupled or uncoupled.

A further object of the invention is to provide a joint which will eliminate the use of threaded connections and wherein structural parts will be reduced to a minimum.

And the invention has as a still further object to provide a joint which will dependably maintain a fluid tight union and wherein flow of fluid through the joint will be unobstructed.

Other and incidental objects will appear hereinafter.

In the drawings:

Figure 1 is a fragmentary side elevation showing the use of my improved pipe joint in conjunction with the hose connections between a conventional locomotive and its tender, Figure 2 is a fragmentary longitudinal section taken medially through the joint, Figure 3 is a fragmentary vertical section taken at substantially right angles to Figure 2, Figure 4 is a plan view of the joint, Figure 5 is a perspective view showing the male and female members of the joint in detail, Figure 6 is an end view of the male member, and Figure 7 is a side elevation showing a slightly modified form of gasket and mounting therefor.

In carrying the invention into effect, my improved joint is formed with a male member having a head 10 upon the inner end of which is formed a pipe or nipple 11 carrying an attaching plate 12. Leading through the head from the inner end of the nipple 11 is, as particularly shown in Figure 2, a passage 13 and formed in the opposite side walls of the head at the inner end of this passage are ports 14. These ports are disposed in registering relation and seated in suitable grooves in the walls of said ports are flanged yieldable gaskets 15. The gaskets are preferably formed of rubber so that said gaskets may be readily flexed to engage the flanges thereof in the grooves of the port walls, it being observed that the outer edges of said flanges lie substantially flush with the outer faces of the side walls of the head. Between the ports, the head is formed internally with a spreader 16 projecting rearwardly in a direction across said ports. The spreader is substantially V-shaped in cross section and is designed to direct the fluid flowing through the passage 13 through both of the ports.

It is now to be observed that the head is tapered longitudinally from its base toward its outer end and is also tapered from its lower side toward its upper side. The head is thus provided with flat side faces 17 converging in two directions or, in other words, converging toward the outer end of the head and also converging toward the upper side of the head. Formed on the outer end of the head is a locking rib 18. As will be observed, this locking rib is tapered toward the upper side of the head and, as particularly shown in Figure 2, is substantially dove-tail in cross section, the rib being formed at its side edges with vertical beveled locking shoulders 19. Formed on the base of the head at opposite sides thereof are forwardly directed locking flanges 20, the free end portions of which lie in spaced relation to the sides of the head and are undercut to provide confronting vertical shoulders 21 converging toward the forward edges of said flanges. Upstanding from the upper edge of the head are spaced lugs 22 and pivoted between these lugs is a clamping bolt 23 upon which is adjustable a nut 24. Loosely fitted upon the bolt is a clamping plate 25 and bearing between this plate and the nut is a helical spring 26 surrounding the bolt. The particular purpose of the clamping bolt with its spring and plate will presently appear.

Formed to mate with the male member is the female member of the joint. This female member is formed with a body 27 branched to provide spaced forks 28 and extending from the body is a reduced nipple 29 defining a shoulder 30 at the inner end of said nipple. As particularly shown in Figure 3, an annular groove 31 is formed at the base of this shoulder. Leading through the forks 28 from the nipple 29 are passages 32 at the inner ends of which are ports 33 through the confronting side walls of said forks. The walls of these ports are grooved in a manner similar to the walls of the ports 14 to receive the flanges of yieldable gaskets 34, these gaskets being identical with the gaskets 15 and being mounted in a similar manner. As will now be observed, the inner side walls of the forks are formed with flat faces 35 which converge toward the upper side of the joint member and which also converge toward their inner ends, these faces being designed to mate with and fit the sloping faces 17 of the head 10 of the male member. Formed between the forks at the inner ends of the faces 35 is a socket 36 for receiving the locking rib 18 of the head of the male member. As particularly shown in Figure 2, the side walls of this socket are formed with beveled shoulders 37 to coact with the shoulders 19 of said rib and, as particularly brought out in Figure 5, the shoulders 37 converge toward their upper ends to conform to the vertical inclination of the shoulders 19. Formed on the forward ends of the forks 28 are locking flanges 38. These flanges are designed to engage beneath the flanges 20 of the male member and are undercut at their outer sides to provide beveled shoulders 39 to coact with the shoulders 21 of the flanges 20. Rigidly coupling the forks 28 at their upper sides is an upstanding bridge 40 having a flat connecting wall 41 in which is formed a slot 42 opening through the forward edge of said wall and upstanding from the wall at opposite sides of said slot are shoulders 43. As will be observed, the bridge 40 will act to brace the forks with respect to each other and will tend to prevent spreading of the forks.

As will now be readily understood in view of the preceding description, the female member may be fitted downwardly over the head of the male member to engage the head between the forks 28 and bring the sloping faces 17 of the head 10 into coacting relation with the sloping faces 35 of said forks when said faces will wedge for tightly locking the members of the joint together. Coincidently, the locking rib 18 will be received within its socket 36 so that the shoulders 19 of said rib will be brought into coacting relation with the shoulders 37 of said socket while the flanges 38 upon the forks 28 will engage beneath the flanges 20 so that the shoulders 39 of the former flanges will be brought into coacting relation with the shoulders 21. When the joint members are thus engaged, the ports 14 of the head of the male member will, as shown in Figure 2, register with the ports 33 of the forks of the female member so that the gaskets 15 will coact with the gaskets 34 to provide sealed joints between said ports and, as will be particularly observed, flow of fluid through the joints will be unobstructed. To complete the operation of connecting the joint members, the clamping bolt 23 is swung upwardly to project through the slot 42 of the bridge 40, the plate 25 being coincidently retracted so as to ride over the shoulders 43. Consequently, when this plate clears the shoulders, it will be moved by the spring 26 to seat flat against the wall 41 of the bridge confronting the shoulders. The plate will, therefore, coact with the shoulders for locking the clamping bolt against rearward swinging movement and will coact with the bridge under the influence of the spring to yieldably wedge the forks of the female member downwardly over the head of the male member in binding contact therewith. The sloping inner side faces of the forks will accordingly be yieldably held to bind downwardly against the sloping outer side faces of the head while the shoulders 37 of the socket 36 will be yieldably urged to coact with the shoulders 19 of the locking rib for drawing the forks of the female member inwardly over the head and yieldably maintaining the sloping faces of the forks in longitudinal binding engagement with the sloping faces of the head. At the same time, the shoulders 39 of the flanges 38 of the forks will bind against the shoulders 21 of the locking flanges 20 for maintaining the free ends of the forks behind the registering ports of the joint in wedging engagement with the side faces of the head 10 so as to obviate any possibility of spreading of the forks. Constantly sealed joints between the gaskets of the members will thus be maintained and, of course, the tension of the spring 26 may be readily varied by adjusting the nuts 24. It will accordingly be seen that I provide a highly effective type of joint and, as will be observed, the members of the joint may be readily connected or disconnected without the necessity for the use of a wrench or any other tool, this feature being highly advantageous in railroad practice.

In Figure 1 of the drawings, I have shown the use of the present type of joint in connection with a locomotive and its tender. The locomotive and tender are conventionally shown and are indicated at 44 and 45 respectively. Beneath the rear end of the locomotive is mounted a bracket 46 and beneath the forward end of the tender is mounted a similar bracket 47. As is well known, connections for several pipes must be made between a locomotive and its tender.

I accordingly employ a suitable number of flexible hose lengths 48 and in conjunction with each length of hose I employ a pair of joints of the present type. The male members of the joints are bolted or otherwise secured by their plates 12 to the brackets 46 and 47 respectively while the female members of the joints are connected to the ends of the hose, one of the latter members being mounted at each end of each length of hose. To accomplish this, the ends of the hose are fitted over the nipples 29 to abut the shoulders 30 when clamping collars are, as clearly seen in Figure 1, engaged around the end portions of the hose in such manner that these collars will act to press the hose into the grooves 31. Tight and secure joints will thus be provided between the hose and the female joint members. Having the hose so equipped, it will be seen that the female members at the forward ends of the hose may be readily engaged with or disengaged from the male joint members upon the bracket 46 and similarly the female members at the rear ends of the hose may be readily engaged with or disengaged from the male joint members upon the bracket 47. Thus, the engine may be readily disconnected from its tender while the hose may be allowed to remain either upon the locomotive or upon the tender, as may be desired.

In Figure 7 of the drawings, I have illustrated a slight modification of the invention which relates particularly to the type of gasket employed and its mounting. A pliable gasket, as illustrated in connection with the preferred construction, cannot be successively employed where steam flows through the joint. Accordingly, in this modified structure, I provide a rigid gasket provided at its outer end with an annular flange 49 and at its inner end with oppositely disposed arcuate lips 50. The walls of the ports 14 and 33 are each formed with oppositely disposed grooves 51 to freely receive the lips 50 therethrough and, as will be observed, these grooves define intermediate oppositely disposed ribs 52. At the outer end of each of said ports in an annular seat 53. Thus, by bringing the lips 50 of the gasket into register with the grooves 51, the gasket may be fitted in place to seat the flange 49 thereof in the seat 53 when, by rotating the gasket, the lips 50 may be moved into coacting relation with the ribs 52 for locking the gasket in place. However, the gasket may, when desired, be readily removed to permit of renewal. Any approved material may be employed in forming the gasket but preferably the gasket is constructed of hard rubber.

Having thus described the invention, what is claimed as new is:

1. A pipe joint including a male member, and a female member straddling the male member and mating therewith, the members being provided with coacting wedging faces, and yieldable means acting upon the members at substantially right angles to the length thereof for urging said faces into wedging engagement.

2. A pipe joint including a male member, a female member straddling the male member and mating therewith, yieldable means acting at substantially right angles to the length of the members urging the female member into wedging engagement with the male member.

3. In a pipe joint, the combination of a male member having a head tapered in vertical transverse section, a female member straddling the head and mating therewith, and yieldable means coacting between the members for urging the members in opposite directions into wedging engagement with each other.

4. A pipe joint including a male member having a head, a female member having forks straddling the head and mating therewith, and means coacting between the members locking the free end portions of said forks against spreading.

5. A pipe joint including a male member having a head gradually tapered in thickness toward its outer end and provided with a locking rib, and a female member having a fork straddling the head to mate therewith and provided with stationary shoulders coacting with said rib for locking the members against longitudinal separation, the members being separable by moving one member laterally of the other.

6. A pipe joint including a male member having a head gradually tapered in thickness toward its outer end and provided with a locking rib formed with beveled shoulders and a female member having forks straddling the head to mate therewith and provided with stationary beveled shoulders coacting with said first mentioned shoulders for locking the members against longitudinal separation, the members being separable by moving one member laterally of the other.

7. A pipe joint including a male member having a head and formed with lateral flanges, and a female member having forks straddling the head to mate therewith and provided with flanges coacting with said first mentioned flanges for locking the free end portions of the forks against spreading.

8. A pipe joint including a male member having a head provided with lateral flanges formed with beveled shoulders, and a female member having forks straddling the head to mate therewith and provided at their free ends with flanges having beveled shoulders coacting with said first mentioned shoulders for locking the free end portions of the forks against spreading.

9. A pipe joint including a male member having a head tapered in cross section, a female member having forks straddling said head and mating therewith, and a spring pressed clamping plate coupled with the male member and acting against the female member at substantially right angles to the length of the members for urging said forks into wedging engagement with the head.

10. A pipe joint including a male member having a head tapered in cross section, a female member having forks straddling the head and mating therewith, a clamping bolt pivoted upon the male member, a bridge coupling the forks of the female member and provided with a shoulder, and a spring pressed clamping plate slidable upon the bolt to coact with the bridge behind said shoulder whereby the forks of the female member will be urged into wedging engagement with the head of the male member while said bolt will be locked in active position.

11. A pipe joint including a male member tapered in cross section, a female member straddling the male member and mating therewith, yieldable means urging the female member into wedging engagement with the male member, and means for adjustably tensioning said first mentioned means.

12. A pipe joint including a male member having a head provided with ports in opposite sides thereof, and a female member having forks straddling said head to mate therewith and provided with ports registering with said first mentioned ports.

13. A pipe joint including a male member having a head provided with ports in opposite sides thereof and formed internally with a spreader between said ports, and a female member having forks straddling said head to mate therewith and provided with ports registering with said first mentioned ports.

14. A pipe joint including a male member having a longitudinally extending head gradually reduced in thickness toward its outer end, a female member straddling the head of the male member and mating therewith, and coacting stationary shoulders carried by the members securing the members against longitudinal separation, the members being separable by moving one member laterally of the other.

15. A pipe joint including a male member having a head, a female member having forks straddling the head and mating therewith, and means locking the free end portions of said forks against spreading.

16. A pipe joint including a male member having a head tapered in vertical transverse section and gradually reduced in thickness toward its outer end, a female member straddling the head of the male member and mating therewith, and stationary means carried by the members securing said members against longitudinal separation, the members being separable by moving one member laterally of the other.

17. A pipe joint including a male member having a head provided with a passage opening through one side thereof, and a female member having forks straddling said head to mate therewith and one provided with a passage in communication with said first mentioned passage, the members being formed with stationary means interlocking for securing the members against longitudinal separation.

18. A pipe joint including a male member having a longitudinally extending head tapered in thickness toward its outer end and provided with a locking rib, and a female member having forks straddling said head and mating therewith, the female member being formed at the crotch between said forks with shoulders coacting with said rib.

In testimony whereof I affix my signature.

ARTHUR T. KUEHNER. [L. S.]